US012696226B2

(12) United States Patent
Keating et al.

(10) Patent No.: US 12,696,226 B2
(45) Date of Patent: Jul. 28, 2026

(54) CORRESPONDING SIDELINK CONTROL INFORMATION TRANSMISSION TO REFERENCE SIGNAL RESOURCES

(71) Applicant: Nokia Technologies Oy, Espoo (FI)

(72) Inventors: Ryan Keating, Naperville, IL (US); Hyun-Su Cha, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 376 days.

(21) Appl. No.: 18/431,424

(22) Filed: Feb. 2, 2024

(65) Prior Publication Data

US 2024/0276424 A1 Aug. 15, 2024

(30) Foreign Application Priority Data

Feb. 10, 2023 (FI) ...................................... 20235136

(51) Int. Cl.
| | |
|---|---|
| *H04W 64/00* | (2009.01) |
| *H04L 5/00* | (2006.01) |
| *H04W 72/25* | (2023.01) |
| *H04W 92/18* | (2009.01) |

(52) U.S. Cl.
CPC ........... *H04W 64/00* (2013.01); *H04L 5/0051* (2013.01); *H04W 72/25* (2023.01); *H04W 92/18* (2013.01)

(58) Field of Classification Search
CPC .............................. H04W 72/25; H04L 5/0051
See application file for complete search history.

(56) References Cited

U.S. PATENT DOCUMENTS

| | | | |
|---|---|---|---|
| 2020/0359367 A1* | 11/2020 | Tang ..................... | H04L 5/0048 |
| 2021/0297206 A1 | 9/2021 | Manolakos et al. | |
| 2022/0039080 A1 | 2/2022 | Khoryaev et al. | |
| 2022/0361142 A1 | 11/2022 | Ko et al. | |
| 2022/0407647 A1 | 12/2022 | Baek et al. | |
| 2023/0096178 A1* | 3/2023 | Wu ........................ | H04W 72/51 |
| | | | 370/329 |

FOREIGN PATENT DOCUMENTS

| | | |
|---|---|---|
| EP | 4013171 A1 | 6/2022 |
| WO | 2022/027298 A1 | 2/2022 |
| WO | 2022/139093 A1 | 6/2022 |

OTHER PUBLICATIONS

Extended European Search Report received for corresponding European Patent Application No. 24155739.6, dated Jul. 2, 2024, 12 pages.

(Continued)

*Primary Examiner* — Justin Y Lee
(74) *Attorney, Agent, or Firm* — Nokia Technologies Oy

(57) ABSTRACT

Embodiments of the present disclosure relate to devices, methods, apparatuses and computer readable storage media of corresponding sidelink control information transmission to sidelink reference signal (RS) resources. The method comprises transmitting, from a first terminal device to a second terminal device, a sidelink control information transmission on a sub-channel, wherein a location of the sub-channel is corresponding to one or more time and frequency resources for a sidelink reference signal transmission; and transmitting, to the second terminal device, the sidelink reference signal transmission using the time and frequency resources.

18 Claims, 6 Drawing Sheets

500

510

TRANSMIT, TO A TERMINAL DEVICE, A SIDELINK CONTROL INFORMATION TRANSMISSION ON A SUB-CHANNEL

520

TRANSMIT, TO THE TERMINAL DEVICE, THE SIDELINK REFERENCE SIGNAL TRANSMISSION USING THE TIME AND FREQUENCY RESOURCES

(56)          References Cited

OTHER PUBLICATIONS

"Discussion on potential solutions for sidelink positioning", 3GPP TSG RAN WG1 #111, R1-2211012, Agenda: 9.5.1.2, vivo, Nov. 14-18, 2022, 22 pages.

"Discussion on sidelink positioning solutions", 3GPP TSG RAN WG1 #110, R1-2207579, Agenda: 9.5.1.3, Xiaomi, Aug. 22-26, 2022, 6 pages.

"Discussion on Potential Solutions for SL Positioning", 3GPP TSG RAN WG1 #111, R1-2212050, Agenda: 9.5.1.2, Samsung, Nov. 14-18, 2022, 13 pages.

"3rd Generation Partnership Project; Technical Specification Group Radio Access Network; NR; Physical layer procedures for data (Release 17)", 3GPP TS 38.214, V17.4.0, Dec. 2022, pp. 1-230.

"3rd Generation Partnership Project; Technical Specification Group Radio Access Network; NR; Physical channels and modulation (Release 17)", 3GPP TS 38.211, V17.4.0, Dec. 2022, pp. 1-136.

"3rd Generation Partnership Project; Technical Specification Group Radio Access Network; LTE Positioning Protocol (LPP) (Release 17)", 3GPP TS 37.355, V17.3.0, Dec. 2022, pp. 1-348.

"3rd Generation Partnership Project; Technical Specification Group Radio Access Network; Study on scenarios and requirements of in-coverage, partial coverage, and out-of-coverage NR positioning use cases (Release 17)", 3GPP TR 38.845, V17.0.0, Sep. 2021, pp. 1-16.

"3rd Generation Partnership Project; Technical Specification Group Services and System Aspects; Service requirements for the 5G system, Stage 1 (Release 19)", 3GPP TS 22.261, V19.1.0, Dec. 2022, 115 pages.

"3rd Generation Partnership Project; Technical Specification Group Services and System Aspects; Service requirements for cyber physical control applications in vertical domains; Stage 1 (Release 18)", 3GPP TS 22.104, V18.3.0, Dec. 2021, pp. 1-101.

"Revised SID on Study on expanded and improved NR positioning", 3GPP TSG RAN Meeting #94e, RP-213588, Agenda: 8.6.1, Intel, Dec. 6-17, 2021, 6 pages.

"New WID on Expanded and Improved NR Positioning", 3GPP TSG RAN Meeting #98-e, RP-223549, Agenda: 9.1.1, Intel Corporation, Dec. 12-16, 2022, pp. 1-7.

"Discussion on SL positioning solutions", 3GPP TSG-RAN WG1 Meeting #110bis-e, R1-2208453, Agenda: 9.5.1.2, Huawei, Oct. 10-19, 2022, 20 pages.

"Msc-generator", Sourceforge, Retrieved on Mar. 8, 2024, Webpage available at :https://sourceforge.net/projects/msc-generator/.

"Discussion on potential solutions for SL positioning", 3GPP TSG RAN WG1 #111, R1-2212371, Agenda: 9.5.1.2, NEC, Nov. 14-18, 2022, 8 pages.

"Discussion on potential solutions for SL positioning", 3GPP TSG RAN WG1 #111, R1-2211447, Agenda: 9.5.1.2, OPPO, Nov. 14-18, 2022, 13 pages.

Office action received for corresponding Finnish Patent Application No. 20235136, dated Jun. 27, 2023, 9 pages.

"Design of SL positioning reference signal SL-PRS", 3GPP TSG RAN WG1 #112, R1-2300040, Agenda: 9.5.1.1, Nokia, Feb. 27-Mar. 3, 2023, 7 pages.

Office action received for corresponding Finnish Patent Application No. 20235136, dated Feb. 7, 2024, 7 pages.

* cited by examiner

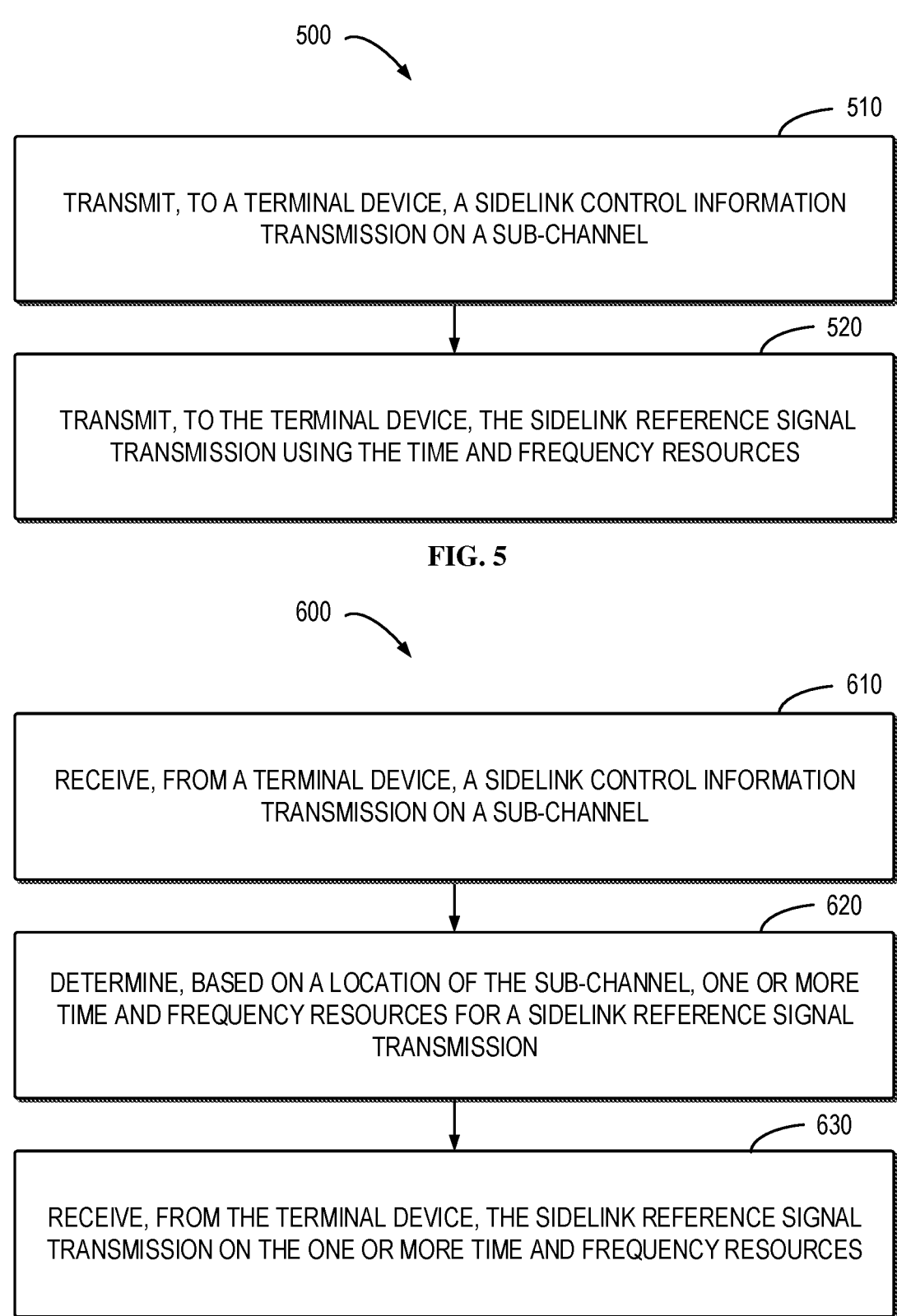

500

510

TRANSMIT, TO A TERMINAL DEVICE, A SIDELINK CONTROL INFORMATION TRANSMISSION ON A SUB-CHANNEL

520

TRANSMIT, TO THE TERMINAL DEVICE, THE SIDELINK REFERENCE SIGNAL TRANSMISSION USING THE TIME AND FREQUENCY RESOURCES

RECEIVE, FROM A TERMINAL DEVICE, A SIDELINK CONTROL INFORMATION TRANSMISSION ON A SUB-CHANNEL

620

DETERMINE, BASED ON A LOCATION OF THE SUB-CHANNEL, ONE OR MORE TIME AND FREQUENCY RESOURCES FOR A SIDELINK REFERENCE SIGNAL TRANSMISSION

630

RECEIVE, FROM THE TERMINAL DEVICE, THE SIDELINK REFERENCE SIGNAL TRANSMISSION ON THE ONE OR MORE TIME AND FREQUENCY RESOURCES

FIG. 6

CORRESPONDING SIDELINK CONTROL INFORMATION TRANSMISSION TO REFERENCE SIGNAL RESOURCES

FIELD

Embodiments of the present disclosure generally relate to the field of telecommunication and in particular to devices, methods, apparatuses and computer readable storage media of corresponding sidelink control information transmission to sidelink reference signal (RS) resources, and especially to the sidelink positioning reference signal (SL-PRS).

BACKGROUND

The study of positioning enhancements has been further developed in 3rd Generation Partnership Project (3GPP). The sidelink positioning resources is one of the interest items for the study and may need to be further discussed.

SUMMARY

In general, example embodiments of the present disclosure provide a solution of corresponding sidelink control information transmission to sidelink reference signal resources.

In a first aspect, there is provided an apparatus. The apparatus comprises at least one processor; and at least one memory storing instructions that, when executed by the at least one processor, cause the apparatus at least to transmit, to a terminal device, a sidelink control information transmission on a sub-channel, wherein a location of the sub-channel is corresponding to one or more time and frequency resources for a sidelink reference signal transmission; and transmit, to the terminal device, the sidelink reference signal transmission using the time and frequency resources.

In a second aspect, there is provided an apparatus. The apparatus comprises at least one processor; and at least one memory storing instructions that, when executed by the at least one processor, cause the apparatus at least to receive, from a terminal device, a sidelink control information transmission on a sub-channel; determine, based on a location of the sub-channel, one or more time and frequency resources for a sidelink reference signal transmission; and receive, from the terminal device, the sidelink reference signal transmission on the one or more time and frequency resources.

In a third aspect, there is provide a method. The method comprises transmitting, from a first terminal device to a second terminal device, a sidelink control information transmission on a sub-channel, wherein a location of the sub-channel is corresponding to one or more time and frequency resources for a sidelink reference signal transmission; and transmitting, to the second terminal device, the sidelink reference signal transmission using the time and frequency resources.

In a fourth aspect, there is provide a method. The method comprises receiving, at a second terminal device and from a first terminal device, a sidelink control information transmission on a sub-channel; determining, based on a location of the sub-channel, one or more time and frequency resources for a sidelink reference signal transmission; and receiving, from the first terminal device, the sidelink reference signal transmission on the one or more time and frequency resources.

In a fifth aspect, there is provided an apparatus comprising means for transmitting, to a terminal device, a sidelink control information transmission on a sub-channel, wherein a location of the sub-channel is corresponding to one or more time and frequency resources for a sidelink reference signal transmission; and means for transmitting, to the terminal device, the sidelink reference signal transmission using the time and frequency resources.

In a sixth aspect, there is provided an apparatus comprising means for receiving, from a terminal device, a sidelink control information transmission on a sub-channel; means for determining, based on a location of the sub-channel, one or more time and frequency resources for a sidelink reference signal transmission; and means for receiving, from the terminal device, the sidelink reference signal transmission on the one or more time and frequency resources.

In a seven aspect, there is provided a computer readable medium having a computer program stored thereon which, when executed by at least one processor of an apparatus, causes the apparatus to carry out the method according to the third aspect or the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings.

FIG. 5 shows a flowchart of an example method of corresponding PSCCH to SL-PRS resources according to some example embodiments of the present disclosure;

FIG. 6 shows a flowchart of an example method of corresponding PSCCH to SL-PRS resources according to some example embodiments of the present disclosure;

Throughout the drawings, the same or similar reference numerals may represent the same or similar element.

DETAILED DESCRIPTION

Figure 1:
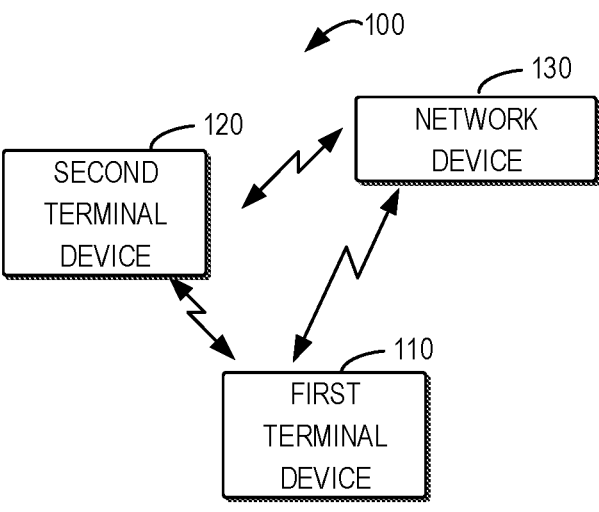
FIG. 1 illustrates an example environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein may be implemented in various manners other than the ones described below.

In the following description and claims, unless defined otherwise, all technical and scientific terms used herein may have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT), an Enhanced Machine type communication (eMTC) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the terms "network device", "radio network device" and/or "radio access network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, low earth orbit (RAN) split architecture includes a Centralized Unit (CU) and a Distributed Unit (DU). In some other example embodiments, part of the radio access network device or full of the radio access network device may embarked on an airborne or space-borne NTN vehicle.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (loT) device, a watch or other wearable, a head-mounted display (HIVID), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

FIG. 1 shows an example communication network 100 in which embodiments of the present disclosure may be implemented. As shown in FIG. 1, the communication network 100 may comprise a first terminal device 110 (hereinafter may also be referred to as a supporting UE or anchor UE) and a second terminal device 120 (hereinafter may also be referred to as a target UE). The first terminal device 110 and the second terminal device 120 may communicate with each other.

In some scenarios, the communication between the first terminal device 110 and the second terminal device 120 in the communication network 100 may referred to as a sidelink communication. In the sidelink communication, the communication between terminal devices (for example, V2V, V2P, V2I communications) can be performed via sidelinks. For the sidelink communication, information may be transmitted from a TX terminal device to one or more RX terminal devices in a broadcast, or groupcast, or unicast manner.

It is to be understood that the number of terminal devices shown in FIG. 1 is given for the purpose of illustration without suggesting any limitations. The communication network 100 may include any suitable number of terminal devices.

Furthermore, the communication network 100 may also comprise a network device 130 (hereinafter may also be referred to as a gNB). The network device 130 may communicate with the first terminal device 110 and/or the second terminal device 110.

In some scenarios, the network device 130 may be responsible for the resource allocation of the sidelink transmission, which may be called as the resource allocation mode 1. For example, the network device 130 may provide grants of sidelink resources to the first terminal device 110 for the sidelink communication between the first terminal device 110 and the second terminal device 120 in the resource allocation mode 1.

In some other scenarios, the terminal device may autonomously select transmission resources for the sidelink communication, which may be called as the resource allocation mode 2. For example, if the first terminal device 110 autonomously select transmission resources for the sidelink communication between the first terminal device 110 and the second terminal device 120, the first terminal device 110 may perform a sensing procedure over the configured sidelink transmission resource pool(s), to obtain the knowledge of the reserved resource(s) by other nearby sidelink UE(s). Based on the knowledge obtained from resource sensing, the first terminal device 110 may select resource(s) from the available sidelink resources, accordingly.

The sidelink control information (SCI) may be decoded for the first terminal device 110 to perform sensing and obtain the necessary information associated with the sidelink transmission. The SCI associated with data transmission may include a $1^{st}$-stage SCI and a $2^{nd}$-stage SCI. For example, the $1^{st}$-stage SCI may be carried by Physical Sidelink Control Channel (PSCCH) and comprise information to enable sensing operations and information needed to determine resource allocation of the Physical Sidelink Shared Channel (PSSCH) and to decode 2nd-stage SCI.

The $2^{nd}$-stage SCI may be carried by PSSCH, which may be multiplexed with sidelink shared channel (sidelink-SCH) and comprise source and destination identities for the sidelink transmission, information to identify and decode the associated sidelink-SCH Transport Block (TB), control of Hybrid Automatic Repeat Request (HARQ) feedback in unicast/groupcast, and a trigger for Channel State Information (CSI) feedback in unicast.

The discussion on positioning enhancements focuses on the sidelink positioning procedure. One of the objectives in this discussion refers to studying and evaluating performance and feasibility of potential solutions for sidelink positioning, considering relative positioning, ranging and absolute positioning. For this objective, the study of sidelink reference signals for positioning purposes from physical layer perspective, including signal design, resource allocation, measurements, and associated procedures.

Furthermore, some agreements were reached about resource pools for the SL-PRS. For example, for a dedicated resource pool for sidelink positioning, with regards to which channels can be included in the resource pool in addition to SL-PRS, the following options may be considered. In option 1, no channel can be included beyond SL-PRS. In option 2, PSCCH which carries SCI associated with SL-PRS transmission(s) is included while in option 3, PSCCH which carries SCI associated with SL-PRS transmission(s) and PSSCH associated with SL-PRS transmission(s) are included.

Another agreement is for the sidelink positioning resource allocation, either dedicated resource pool(s) and/or a shared resource pool(s) with sidelink communication can be (pre-) configured for SL-PRS.

The resource allocation for SL-PRS may include scheme 1 and scheme 2, where scheme 1 corresponds to a network-centric sidelink positioning reference signal (SL PRS) resource allocation and scheme 2 corresponds to UE autonomous SL PRS resource allocation. For resource allocation mechanism for SL PRS in scheme 2, sensing-based resource allocation and/or a random resource selection are supported.

Meanwhile, the solutions for congestion control for SL PRS and/or inter-UE coordination for SL-PRS may be specified.

Furthermore, resource allocation for shared resource pool with sidelink communication and dedicated resource pool for SL PRS are supported.

In a positioning procedure, a UE may need to receive SL PRS from multiple other nodes and/or transmit SL PRS to multiple other nodes. Ideally these receptions or transmission happen simultaneously (or nearly simultaneously) so that the location of the UE can be determined with low latency and without movement of the various nodes impacting the estimation. In Uu based positioning procedure, this may be achieved, for example in Downlink Time Difference Of Arrival (DL-TDOA), by having the gNBs transmit the Downlink Positioning Reference Signal (DL PRS) at the same symbol(s) and with different comb offsets.

An additional complexity in sidelink positioning is the resource reservation/scheduling which is involved. Therefore, how to indicate different time and frequency domain behaviors of SL PRS may still need to be discussed.

The solution of the present disclosure proposes a mechanism of corresponding sidelink control information transmission to sidelink reference signal resources. In this solution, the first terminal device 110 transmits to the second terminal device 120 a sidelink control information transmission on a sub-channel. The location of the sub-channel is corresponding to one or more time and frequency resources for a sidelink reference signal transmission. The first terminal device 110 then transmits the sidelink reference signal transmission using the time and frequency resources.

In this way, the sidelink control information transmission resources may be mapped to sidelink reference signal resources. Based on the certain mapping or correspondence and the sidelink control information transmission resources, a target UE may be aware of the resources for the sidelink reference signal transmission.

Example embodiments of the present disclosure will be described in detail below with reference to the accompanying drawings.

Figure 2:
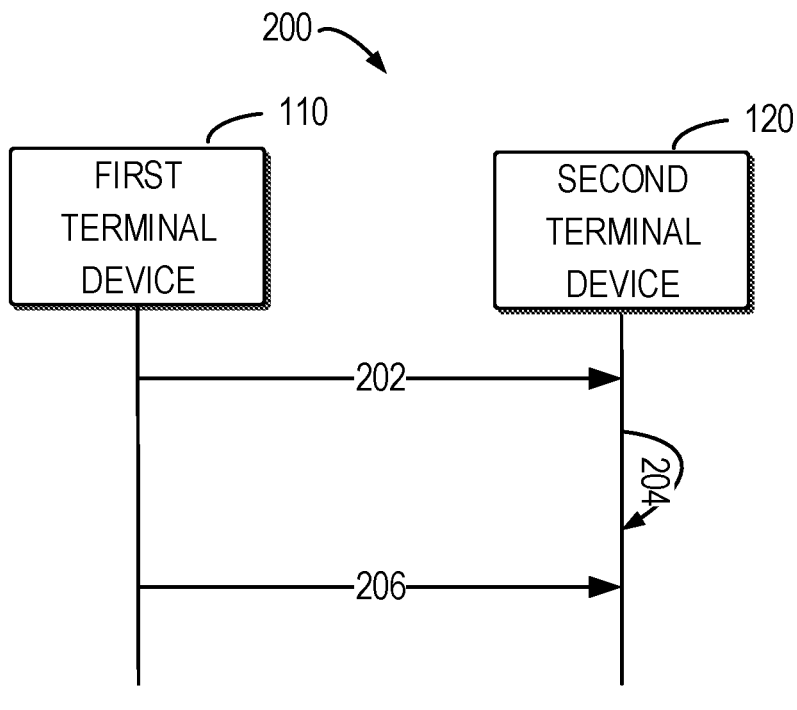
FIG. 2 shows a signaling chart illustrating an example of process according to some example embodiments of the present disclosure.

Reference is now made to FIG. 2, which shows a signaling chart 200 for communication according to some example embodiments of the present disclosure. As shown in FIG. 2, the signaling chart 200 involves the first terminal device 110 and the second terminal device 120. For the purpose of discussion, reference is made to FIG. 1 to describe the signaling chart 200.

In the scenario shown in FIG. 2, the first terminal device 110, (i.e., the supporting UE) is involved in a sidelink positioning session with the second terminal device (i.e., the target UE). It is to be understood that the first terminal device 110 may al so act as a target UE while the second terminal device may also act as a supporting UE in some other scenarios.

Sub-channels for sidelink control information transmission may be mapped to reference signal transmission occasions and the second terminal device. Specifically, sub-channels for sidelink control information transmission may correspond to the SL PRS transmission occasions. It is to be understood that the sidelink control information transmission used herein may be referred to as a transmission via a PSCCH or a sidelink control channel. Moreover, in addition to SL PRS, the reference signal transmission used hereinafter may also be replaced by or referred to other reference signal for the positioning propose.

As an option, the correspondence may be predefined, which means the second terminal device 120 may be aware of this correspondence without an explicit signalling from network. As another option, the correspondence may be pre-configured by the network device 130. Then the network device 130 may indicate the correspondence to the second terminal device 120 via a higher layer signalling, for example, via a Radio Resource Control (RRC) signalling.

It is also possible that the correspondence may be configured by the first terminal device 110. The first terminal device 110 may indicate the correspondence to the second terminal device 120.

As shown in FIG. 2, the first terminal device 110 transmit (202) a sidelink control information transmission, e.g., a PSCCH transmission, on a sub-channel to the second terminal device 120. The sub-channel may refer to a certain frequency range and/or time range.

Based on the location, i.e., the frequency range, of the sub-channel, and the correspondence between the sub-channels for sidelink control information transmission and the SL PRS transmission occasions, the second terminal device 120 may determine (204) resources, i.e., in the time domain and the frequency domain, for a SL PRS transmission from the first device terminal device 110 corresponding to the location of the sub-channel used for the sidelink control information transmission.

Figure 3A:
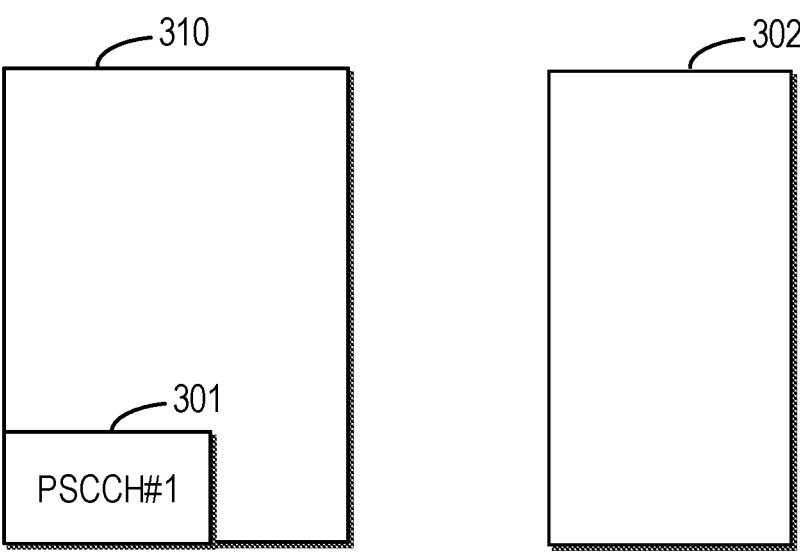
FIGS. 3A and 3B show examples of corresponding Physical Sidelink Control Channel (PSCCH) resources to SL-PRS resources of according to some example embodiments of the present disclosure.
Figure 3B:
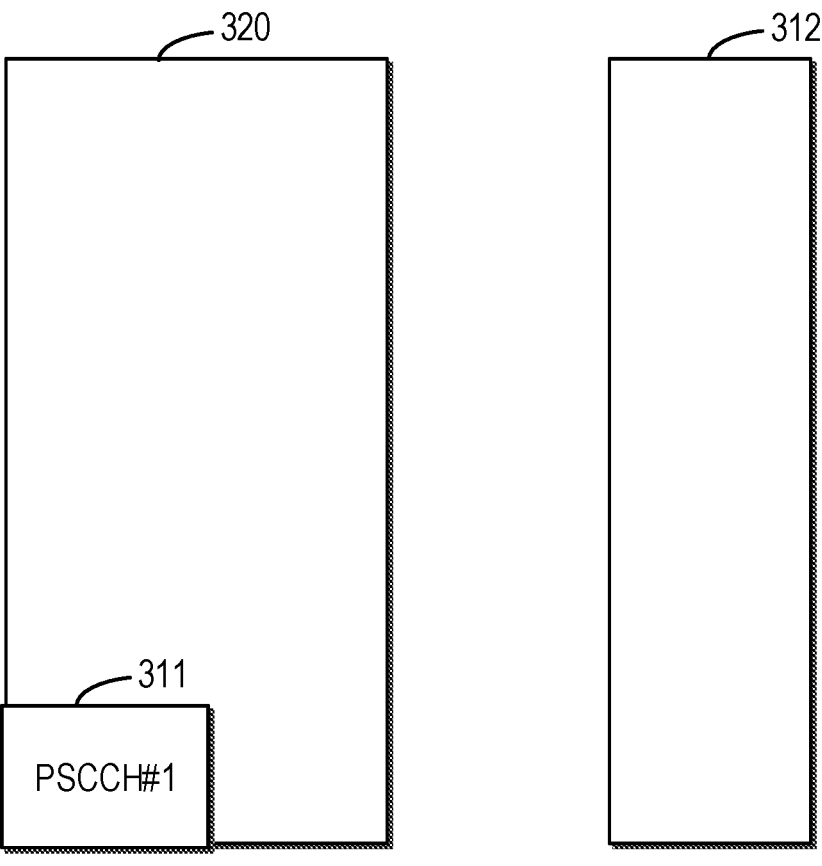

As described above, the resources for the sidelink control information transmission may be in a shared resource pool or in a dedicated resource pool. FIGS. 3A and 3B shows examples of corresponding PSCCH resources to SL-PRS resources. z As shown in FIG. 3A, if the PSCCH resources 301 are allocated from a shared resource pool 310, then the SL PRS resource 302 may also be allocated from the shared resource pool 310. As in FIG. 3B, if the PSCCH resources 311 are allocated from a dedicated resource pool 320, then the SL PRS resource 312 may also be allocated from the dedicated resource pool 320.

In a case where the PSCCH resources in a shared resource pool indicates the SL PRS resources in the shared resource pool, the correspondence between the sub-channels for sidelink control information transmission and the SL PRS transmission occasions may define at least the comb offset to be used for the SL-PRS transmission and the slots/sub-slots where the SL-PRS transmission to be transmitted. The terms "sub-slots" used hereinafter may also be called as mini-slots.

If the second terminal device 120 assumes that the full slot is being occupied by the SL-PRS transmission, the second terminal device 120 may treat the full slot as occupied for sensing purposes.

Based on the slots/sub-slots where the SL-PRS transmission to be transmitted defined in the correspondence, the second terminal device 120 may be able to determine the sub-slots used for SL-PRS transmission and therefore may still determine that there are available resources for a particular sub-slot during the sensing procedure despite an SCI indicating resources in that slot being used.

In a case where the PSCCH resources in a dedicated resource pool indicates the SL PRS resources in the dedicated resource pool, the correspondence between the sub-channels for sidelink control information transmission and the SL PRS transmission occasions may define at least the comb-offset to be used for the SL-PRS transmission and the sub-slots where the SL-PRS transmission is to be transmitted.

Based on the correspondence, other UEs may be able to determine the sub-slots used for SL-PRS transmission and therefore may still determine that there are available resources for a particular sub-slot during the sensing procedure despite an SCI indicating resources in that slot being used.

In some other embodiments, the correspondence may indicate that the location of the sub-channel used for PSCCH transmission may be tied with only a pre-configured resource element (RE) offset of a SL PRS resource. That is, if the second terminal device 120 detects the presence of the PSCCH in a certain location in the dedicated SL-PRS resource, the second terminal device 120 may directly infer the frequency RE offset (i.e., comb-offset), and the PSCCH may contain/configure sub-slot offset or slot offset only.

In some other embodiments, the correspondence may indicate that the location of the sub-channel used for PSCCH transmission may be tied with a pre-configured sub-slot offset or slot offset. That is, if the second terminal device 120 detects the presence of the PSCCH in a certain location in the dedicated SL-PRS resource, the second terminal device 120 may directly infer the sub-slot offset or slot-offset, and the PSCCH may contain/configure the RE-offset only (i.e., the comb-offset).

In some other embodiments, the correspondence may indicate that the location of the sub-channel used for PSCCH transmission may be tied with both of a pre-configured sub-slot offset (i.e., a slot offset) and a pre-configured RE offset (i.e., a comb-offset).

Figure 4A:
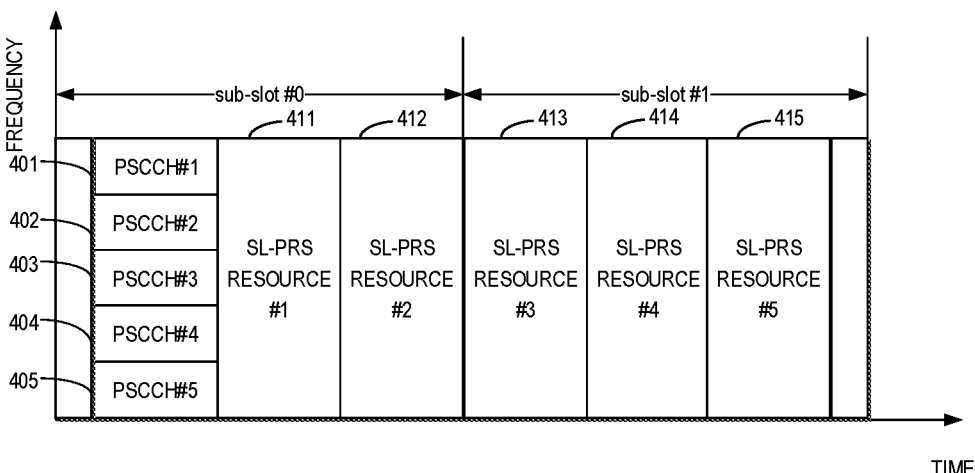
FIGS. 4A and 4B show examples of resource allocation according to some example embodiments of the present disclosure.

For example, as shown in FIG. 4A, PSCCH #1 401 and PSCCH #2 402 may schedule SL PRS resource #1 411 and SL PRS resource #2 412 respectively, and PSCCH #3 403, PSCCH #4 404, and PSCCH #5 405 may schedule SL PRS resource #3 413, SL PRS resource #4 414, and SL PRS resource #5 415, respectively. In this example, the sub-slot offset of PSCCH #1 401 and PSCCH #2 402 may be (pre-)configured as "zero" by higher layer signalling, and the sub-slot offset of PSCCH #3 403, PSCCH #4 404, and PSCCH #5 405 may be (pre-)configured as "one" by high layer signalling.

In some other embodiments, the correspondence may indicate that SL-PRS resources may depend on the location of the sub-channel in a frequency domain, i.e., resource allocation order by PSCCH may be frequency first.

Figure 4B:
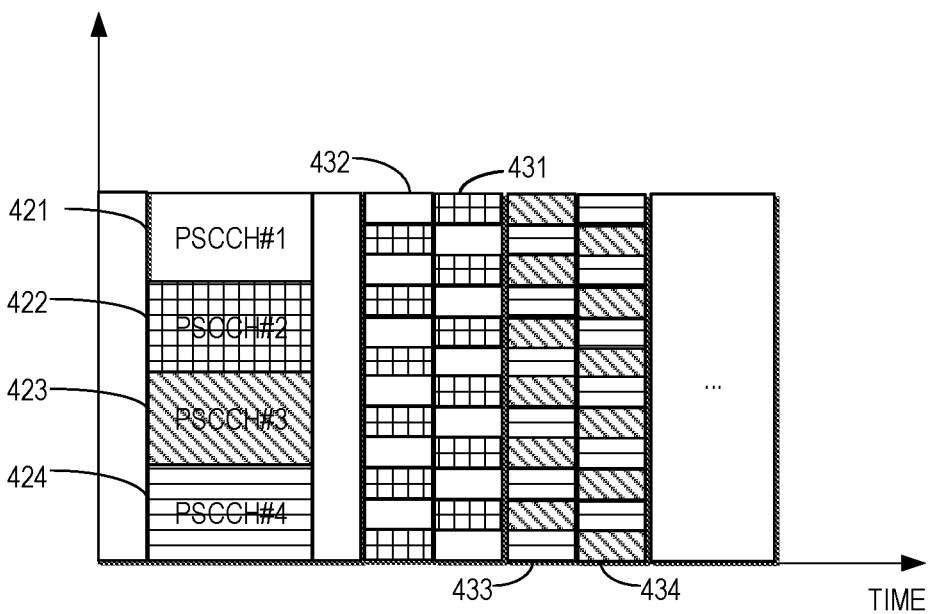

For example, as shown in FIG. 4B, assuming comb-2 SL-PRS resource, PSCCH #1 421 may schedule comb-offset 0 for SL-PRS resource #1 (for example block 432) and PSCCH #2 422 may schedule PRS resource #2 (for example block 431) with comb-offset 1. Then the frequency resource is fully occupied, so the UE may understand PSCCH #3 423 and PSCCH #4 424 may schedule PRS resource #3 (for example block 434) and PRS resource #4 (for example block 433) with symbol-offset of 2.

After determining the SL PRS resource for a SL PRS transmission based on the correspondence and the location of the sub-channel, as shown in FIG. 2, if the second device determines that there are no conflicts in the corresponding resource, the second terminal device 120 may receive (206) the SL PRS transmission from the first terminal device 110 on the determined SL PRS resource.

It is to be understood that the PSCCH location may indicate more than one SL PRS resources, for example, for a double-sided Round Trip Time (RTT) or for a periodic SL PRS.

As another option, the solution described above may also be used for a case where the supporting UE not only signals the resources/sub-slots used for SL PRS transmitted by the supporting UE but also by the target UE. That is, the supporting UE may indicate by the PSCCH location both the resources/sub-slots for the supporting UEs transmission of SL PRS or for the transmission of SL PRS from the target UEs (e.g., in the case of RTT).

In this way, the sidelink control information transmission resources may be mapped to sidelink reference signal resources. Based on the certain mapping or correspondence and the sidelink control information transmission resources, a target UE may be aware of the resources for the sidelink reference signal transmission.

Based on the solution of the present disclosure, the sidelink positioning sensing for resource reservation may be improved and SL-PRS may be reduced. Furthermore, the scheduling/reservation of SL-PRS resources may be more efficient.

FIG. 5 shows a flowchart of an example method 500 of corresponding sidelink control information transmission to sidelink reference signal resources according to some example embodiments of the present disclosure. The method 500 may be implemented at the first terminal device 110 as shown in FIG. 1. For the purpose of discussion, the method 500 will be described with reference to FIG. 1.

At 510, the first terminal device 110 transmits, to a second terminal device 120, a sidelink control information transmission on a sub-channel, wherein a location of the sub-channel is corresponding to one or more time and frequency resources for a sidelink reference signal transmission.

At 520, the first terminal device 110 transmits, to a second terminal device 120, the sidelink reference signal transmission using the time and frequency resources.

In some example embodiments, the correspondence between the location of the sub-channel and the one or more time and frequency resources for the sidelink reference signal transmission is predefined or preconfigured by a network device or configured by the apparatus.

In some example embodiments, in a case where resources for the sidelink control information transmission in a shared resource pool indicates the time and frequency resources for the sidelink reference signal transmission in the shared resource pool, the correspondence indicates a comb-offset to be used for the sidelink reference signal transmission and slots or sub-slots where the sidelink reference signal transmission is to be transmitted.

In some example embodiments, in a case where resources for the sidelink control information transmission in a dedicated resource pool indicates the time and frequency resources for the sidelink reference signal transmission in the dedicated resource pool, the correspondence indicates a comb-offset to be used for the sidelink reference signal transmission and sub-slots where the sidelink reference signal transmission is to be transmitted.

In some example embodiments, the correspondence indicates that the location of the sub-channel is associated with at least one of the following: a pre-configured comb-offset for the one or more time and frequency resources for the sidelink reference signal transmission, or a pre-configured sub-slot offset or a pre-configured slot offset for the one or more time and frequency resources for the sidelink reference signal transmission.

In some example embodiments, the correspondence indicates that the one or more time and frequency resources for the sidelink reference signal transmission depends on the location of the sub-channel in a frequency domain.

In some example embodiments, the correspondence between the location of the sub-channel and the time and frequency resources for the sidelink reference signal transmission indicates information about at least one of: one or more transmission beams, one or more transmission beams, one or more muting patterns, a number of symbols, or bandwidth.

In some example embodiments, the reference signal is associated with a positioning procedure.

FIG. 6 shows a flowchart of an example method 600 of corresponding sidelink control information transmission to sidelink reference signal resources according to some example embodiments of the present disclosure. The method 600 may be implemented at the second terminal device 120 as shown in FIG. 1. For the purpose of discussion, the method 600 will be described with reference to FIG. 1.

At 610, the second terminal device 120 receives, from a first terminal device 110, a sidelink control information transmission on a sub-channel.

At 620, the second terminal device 120 determines, based on a location of the sub-channel, one or more time and frequency resources for a sidelink reference signal transmission.

At 630, the second terminal device 120 receives, from the first terminal device 110, the sidelink reference signal transmission on the one or more time and frequency resources.

In some example embodiments, the second terminal device 120 may further obtain the correspondence between the location of the sub-channel and the one or more time and frequency resources for the sidelink reference signal transmission.

In some example embodiments, the correspondence between the location of the sub-channel and the one or more time and frequency resources for the sidelink reference signal transmission is predefined or preconfigured by a network device or configured by the terminal device.

In some example embodiments, the second terminal device 120 may further determine the one or more time and frequency resources for the sidelink reference signal transmission based on the location of the sub-channel and the correspondence.

In some example embodiments, in a case where resources for the sidelink control information transmission in a shared resource pool indicates the time and frequency resources for the sidelink reference signal transmission in the shared resource pool, the correspondence indicates a comb-offset to be used for the sidelink reference signal transmission and slots or sub-slots where the sidelink reference signal transmission is to be transmitted.

In some example embodiments, the available resources for a sub-slot are allowed to be sensed during the sensing procedure if sidelink control information indicates resources in the sub-slot are used.

In some example embodiments, in a case where resources for the sidelink control information transmission in a dedicated resource pool indicates the time and frequency resources for the sidelink reference signal transmission in the dedicated resource pool, the correspondence indicates a comb-offset to be used for the sidelink reference signal transmission and sub-slots where the sidelink reference signal transmission is to be transmitted.

In some example embodiments, the correspondence indicates that the location of the sub-channel is associated with at least one of the following: a pre-configured comb-offset for the one or more time and frequency resources for the sidelink reference signal transmission, or a pre-configured sub-slot offset or slot offset for the one or more time and frequency resources for the sidelink reference signal transmission.

In some example embodiments, the correspondence indicates that the one or more time and frequency resources for the sidelink reference signal transmission depends on the location of the sub-channel in a frequency domain.

In some example embodiments, the correspondence between the location of the sub-channel and the time and frequency resources for the sidelink reference signal transmission indicates information about at least one of: one or more transmission beams, one or more transmission beams, one or more muting patterns, a number of symbols, or bandwidth.

In some example embodiments, the reference signal is associated with a positioning procedure.

In some example embodiments, an apparatus capable of performing the method 500 (for example, implemented at the first terminal device 110) may include means for performing the respective steps of the method 500. The means may be implemented in any suitable form. For example, the means may be implemented in a circuitry or software module.

In some example embodiments, the apparatus comprises means for transmitting, to a terminal device, a sidelink control information transmission on a sub-channel, wherein a location of the sub-channel is corresponding to one or more time and frequency resources for a sidelink reference signal transmission; and means for transmitting, to the terminal device, the sidelink reference signal transmission using the time and frequency resources.

In some example embodiments, an apparatus capable of performing the method 600 (for example, implemented at the second terminal device 120) may include means for performing the respective steps of the method 600. The means may be implemented in any suitable form. For example, the means may be implemented in a circuitry or software module.

In some example embodiments, the apparatus comprises means for receiving, from a terminal device, a sidelink control information transmission on a sub-channel; means for determining, based on a location of the sub-channel, one or more time and frequency resources for a sidelink reference signal transmission; and means for receiving, from the terminal device, the sidelink reference signal transmission on the one or more time and frequency resources.

Figure 7:
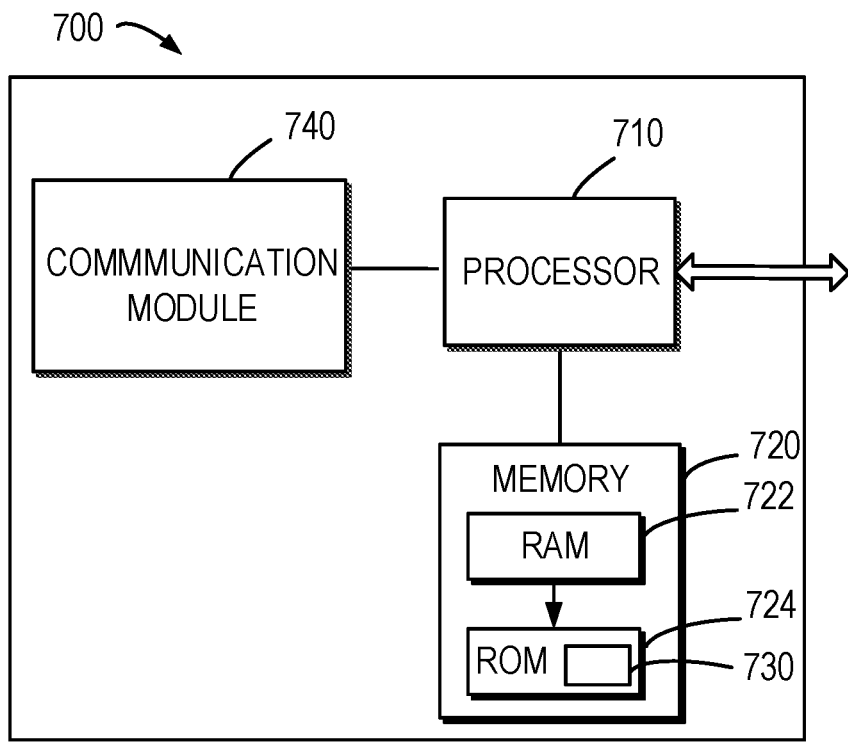
FIG. 7 shows a simplified block diagram of a device that is suitable for implementing example embodiments of the present disclosure.

FIG. 7 is a simplified block diagram of a device 700 that is suitable for implementing example embodiments of the present disclosure. The device 700 may be provided to implement a communication device, for example, the first terminal device 110 or the second terminal device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The instructions of the program 730 may include instructions for performing operations/acts of some example embodiments of the present disclosure. The program 730 may be stored in the memory, e.g., the ROM 724. The processor 710 may perform any suitable actions and processing by loading the program 730 into the RAM 722.

The example embodiments of the present disclosure may be implemented by means of the program 730 so that the device 700 may perform any process of the disclosure as discussed with reference to FIG. 2 to FIG. 6. The example embodiments of the present disclosure may also be implemented by hardware or by a combination of software and hardware.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 8:
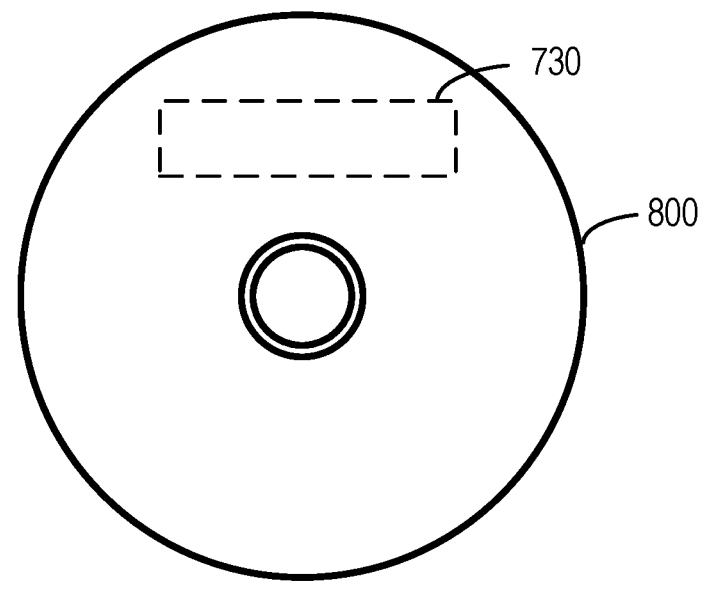
FIG. 8 shows a block diagram of an example computer readable medium in accordance with some embodiments of the present disclosure.

FIG. 8 shows an example of the computer readable medium 800 which may be in form of CD, DVD or other optical storage disk. The computer readable medium 800 has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provides at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

PARTIAL GLOSSARY

5G Fifth Generation
LTE Long Term Evolution

LTE-A LTE-Advanced
WCDMA Wideband Code Division Multiple Access
HSPA High-Speed Packet Access
NB-IoT Narrow Band Internet of Things
NR New Radio
BS Base Station
AP Access Point
eNodeB Evolved NodeB
gNB/NR NB Next Generation NodeB
RRU Remote Radio Unit
RH Radio Header
RRH Remote Radio Head
SS Subscriber Station
MS Mobile Station
AT Access Terminal
VoIP Voice over IP
PDA Personal Digital Assistant
LEE Laptop-embedded Equipment
LME Laptop-mounted Equipment
USB Universal Serial Bus
CPE Customer-Premises Equipment
HMD Head-mounted Display
MT Mobile Termination
IAB Integrated Access and Backhaul
NTN non-terrestrial network
LEO low earth orbit
GEO geosynchronous earth orbit
RAN low earth orbit
CU Centralized Unit
DU Distributed Unit
DL Downlink
UL Uplink
Tx Transmitting
Rx Receiving
PRB physical resource block
3GPP 3rd Generation Partnership Project
PRS Positioning Reference Signal
PSCCH Physical Sidelink Control Channel
RP Resource Pool
RTT Round Trip Time
SCI Sidelink Control Information
S-UE Supporting UE
SL Sidelink
T/F Time/Frequency
T-UE Target UE
UE User Equipment
HARQ Hybrid Automatic Repeat Request
TB Transport Block
CSI Channel State Information
TDOA Time Difference Of Arrival
RE resource element

What is claimed is:

1. An apparatus comprising:
at least one processor; and
at least one memory storing instructions that, when
executed by the at least one processor, cause the
apparatus at least to:
transmit, to a terminal device, a sidelink control infor-
mation transmission on a sub-channel, wherein a
location of the sub-channel is corresponding to one
or more time and frequency resources of a sidelink
positioning reference signal resource in at least one
of a shared resource pool or a dedicated resource
pool for a sidelink positioning reference signal trans-
mission, where the one or more time resources are at
least one slot and/or at least one sub-slot; and transmit, to the terminal device, the sidelink position-
ing reference signal transmission using the one or
more time and frequency resources,
wherein the correspondence between the location of the
sub-channel and the one or more time and frequency
resources for the sidelink positioning reference signal
transmission is predefined or preconfigured by a net-
work device or configured by the apparatus, and
transmit an association information between a Physical
Sidelink Control Channel (PSCCH) transmitted in a
respective sub-channel and an allocated sidelink posi-
tioning reference signal (SL-PRS) resource, for at least
one of respective associated pairs of PSCCH sub-
channel location(s) and SL-PRS resource(s).

2. The apparatus of claim 1, wherein resources for the
sidelink control information transmission in the shared
resource pool indicates the one or more time and frequency
resources for the sidelink positioning reference signal trans-
mission in the shared resource pool, and wherein the cor-
respondence indicates a comb-offset to be used for the
sidelink positioning reference signal transmission and slots
or sub-slots where the sidelink positioning reference signal
transmission is to be transmitted.

3. The apparatus of claim 1, wherein resources for the
sidelink control information transmission in the dedicated
resource pool indicates the one or more time and frequency
resources for the sidelink positioning reference signal trans-
mission in the dedicated resource pool, and wherein the
correspondence indicates a comb-offset to be used for the
sidelink positioning reference signal transmission and sub-
slots where the sidelink positioning reference signal trans-
mission is to be transmitted.

4. The apparatus of claim 1, wherein the correspondence
indicates that the location of the sub-channel is associated
with at least one of the following:
a pre-configured comb-offset for the one or more time and
frequency resources for the sidelink positioning refer-
ence signal transmission, or
a pre-configured sub-slot offset or a pre-configured slot
offset for the one or more time and frequency resources
for the sidelink positioning reference signal transmis-
sion.

5. The apparatus of claim 1, wherein the correspondence
indicates that the one or more time and frequency resources
for the sidelink positioning reference signal transmission
depends on the location of the sub-channel in a frequency
domain.

6. The apparatus of claim 1, wherein the correspondence
between the location of the sub-channel and the one or more
time and frequency resources for the sidelink positioning
reference signal transmission indicates information about at
least one of:
one or more transmission beams,
a repetition factor,
one or more muting patterns,
a number of symbols, or
bandwidth.

7. The apparatus of claim 1, wherein the reference signal
is associated with a positioning procedure.

8. An apparatus comprising:
at least one processor; and
at least one memory storing instructions that, when
executed by the at least one processor, cause the
apparatus at least to:
receive, from a terminal device, a sidelink control
information transmission on a sub-channel;

determine, based on a location of the sub-channel, one or more time and frequency resources of a sidelink positioning reference signal resource in at least one of a shared resource pool or a dedicated resource pool for a sidelink positioning reference signal transmission, where the time resources are at least one slot and/or at least one sub-slot; and receive, from the terminal device, the sidelink positioning reference signal transmission on the one or more time and frequency resources, wherein the correspondence between the location of the sub-channel and the one or more time and frequency resources for the sidelink positioning reference signal transmission is predefined or preconfigured by a network device or configured by the terminal device, and receive an association information between a Physical Sidelink Control Channel (PSCCH) transmitted in a respective sub-channel and an allocated sidelink positioning reference signal (SL-PRS) resource, for at least one of respective associated pairs of PSCCH sub-channel location(s) and SL-PRS resource(s).

9. The apparatus of claim 8, wherein the apparatus is further caused to:
obtain the correspondence between the location of the sub-channel and the one or more time and frequency resources for the sidelink positioning reference signal transmission.

10. The apparatus of claim 8, wherein the apparatus is further caused to:
determine the one or more time and frequency resources for the sidelink positioning reference signal transmission based on the location of the sub-channel and the correspondence.

11. The apparatus of claim 8, wherein resources for the sidelink control information transmission in the shared resource pool indicates the one or more time and frequency resources for the sidelink positioning reference signal transmission in the shared resource pool, and wherein the correspondence indicates a comb-offset to be used for the sidelink positioning reference signal transmission and slots or sub-slots where the sidelink positioning reference signal transmission is to be transmitted.

12. The apparatus of claim 11, wherein the available resources for a sub-slot are allowed to be sensed during the sensing procedure if sidelink control information indicates resources in the sub-slot are used.

13. The apparatus of claim 8, wherein resources for the sidelink control information transmission in the dedicated resource pool indicates the time and frequency resources for the sidelink positioning reference signal transmission in the dedicated resource pool, and wherein the correspondence indicates a comb-offset to be used for the sidelink positioning reference signal transmission and sub-slots where the sidelink positioning reference signal transmission is to be transmitted.

14. The apparatus of claim 8, wherein the correspondence indicates that the location of the sub-channel is associated with at least one of the following:
a pre-configured comb-offset for the one or more time and frequency resources for the sidelink positioning reference signal transmission, or
a pre-configured sub-slot offset or slot offset for the one or more time and frequency resources for the sidelink positioning reference signal transmission.

15. The apparatus of claim 8, wherein the correspondence indicates that the one or more time and frequency resources for the sidelink positioning reference signal transmission depends on the location of the sub-channel in a frequency domain.

16. The apparatus of claim 8, wherein the correspondence between the location of the sub-channel and the time and frequency resources for the sidelink positioning reference signal transmission indicates information about at least one of:
one or more transmission beams,
a repetition factor,
one or more muting patterns,
a number of symbols, or
bandwidth.

17. The apparatus of claim 8, wherein the reference signal is associated with a positioning procedure.

18. A method comprising:
transmitting, from a first terminal device to a second terminal device, a sidelink control information transmission on a sub-channel, wherein a location of the sub-channel is corresponding to one or more time and frequency resources of a sidelink positioning reference signal resource in at least one of a shared resource pool or a dedicated resource pool for a sidelink positioning reference signal transmission, where the time resources are at least one slot and/or at least one sub-slot; and transmitting, to the second terminal device, the sidelink positioning reference signal transmission using the time and frequency resources, wherein the correspondence between the location of the sub-channel and the one or more time and frequency resources for the sidelink positioning reference signal transmission is predefined or preconfigured by a network device or configured by the first terminal device, and transmitting an association information between a Physical Sidelink Control Channel (PSCCH) transmitted in a respective sub-channel and an allocated sidelink positioning reference signal (SL-PRS) resource, for at least one of respective associated pairs of PSCCH sub-channel location(s) and SL-PRS resource(s).

* * * * *